United States Patent
Breon et al.

(10) Patent No.: US 10,626,290 B2
(45) Date of Patent: Apr. 21, 2020

(54) METHOD OF EXTENDING POT LIFE OF COATING COMPOSITIONS

(71) Applicant: PPG Industries Ohio, Inc., Cleveland, OH (US)

(72) Inventors: Jonathan P. Breon, Pittsburgh, PA (US); Robert E. Jennings, Ellwood City, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 2 days.

(21) Appl. No.: 14/107,389

(22) Filed: Dec. 16, 2013

(65) Prior Publication Data

US 2015/0166826 A1 Jun. 18, 2015

(51) Int. Cl.
| | | |
|---|---|---|
| *B05D 1/02* | (2006.01) | |
| *C09D 175/02* | (2006.01) | |
| *B05D 3/00* | (2006.01) | |
| *C08G 18/32* | (2006.01) | |
| *C08L 79/02* | (2006.01) | |

(52) U.S. Cl.
CPC ............. *C09D 175/02* (2013.01); *B05D 1/02* (2013.01); *B05D 3/007* (2013.01); *C08G 18/3265* (2013.01); *C08L 79/02* (2013.01)

(58) Field of Classification Search
CPC . C08L 79/02; B05D 3/067; B05D 1/02; C08J 2201/026
See application file for complete search history.

(56) References Cited

U.S. PATENT DOCUMENTS

| 3,425,964 | A | * | 2/1969 | Stanley ......................... 521/128 |
| 3,499,872 | A | | 3/1970 | Thoma et al. |
| 4,469,856 | A | * | 9/1984 | Rasshofer et al. .............. 528/45 |
| 4,645,630 | A | * | 2/1987 | Rasshofer et al. .............. 264/54 |
| 4,980,388 | A | * | 12/1990 | Herrington et al. .......... 521/130 |
| 5,006,569 | A | | 4/1991 | Stone |
| 5,008,137 | A | * | 4/1991 | Nugent et al. ................ 428/35.4 |
| 5,084,202 | A | * | 1/1992 | Lin .................... C07C 273/1827 252/182.2 |
| 5,189,073 | A | | 2/1993 | Humbert et al. |
| 5,288,766 | A | | 2/1994 | Narayan et al. |
| 5,300,541 | A | * | 4/1994 | Nugent et al. ................ 523/414 |
| 5,428,124 | A | * | 6/1995 | Slack .................. C08G 18/6795 521/159 |
| 5,451,697 | A | * | 9/1995 | McGhee et al. .............. 560/345 |
| 5,726,251 | A | * | 3/1998 | Wilkinson et al. ......... 525/327.3 |
| 5,728,439 | A | * | 3/1998 | Carlblom et al. .......... 428/36.91 |
| 5,847,027 | A | * | 12/1998 | Marten et al. ................ 523/404 |
| 6,339,129 | B1 | | 1/2002 | Webster |
| 7,288,595 | B2 | * | 10/2007 | Swarup et al. ................ 525/157 |
| 2008/0141902 | A1 | * | 6/2008 | Valenta et al. ............. 106/287.2 |
| 2011/0076485 | A1 | | 3/2011 | Yakulis, Jr. et al. |
| 2012/0136323 | A1 | * | 5/2012 | Stasko et al. ................. 604/290 |
| 2012/0142817 | A1 | * | 6/2012 | Swarup et al. ................ 523/400 |
| 2012/0238655 | A1 | * | 9/2012 | Lindner et al. ............... 521/130 |
| 2012/0245243 | A1 | * | 9/2012 | Lindner et al. ............... 521/172 |
| 2013/0004677 | A1 | * | 1/2013 | Hwang et al. ................ 427/512 |
| 2013/0079435 | A1 | * | 3/2013 | Raymond et al. ............ 523/400 |
| 2013/0237681 | A1 | * | 9/2013 | Burckhardt ..................... 528/68 |
| 2013/0261270 | A1 | * | 10/2013 | Butikofer et al. ............. 525/423 |
| 2015/0166826 | A1 | * | 6/2015 | Breon et al. .................. 524/874 |

FOREIGN PATENT DOCUMENTS

KR 20120073308 7/2012

OTHER PUBLICATIONS

Desmophen NH 1420 data sheet. No Author, no date. Obtained from http://www.jaekle.de/fileadmin/MeBI/212/MeBI_212801_EN.pdf on Oct. 23, 2015.*
Ethylenediamine data sheet. No author, no date. Obtained from http://www.chemicalland21.com/industrialchem/organic/ETHYLENEDIAMINE.htm on Oct. 23, 2015.*
1,3-diaminopropane data sheet. No author, no date. Obtained from http://www.chemicalbook.com/ProductMSDSDetailCB7852787_EN.htm on Oct. 23, 2015.*
1,4-diaminobutane price sheet. Obtained from http://www.sigmaaldrich.com/ on Dec. 28, 2015. No Author, no date.*
Butylamine price sheet. Obtained from http://www.sigmaaldrich.com/ on Dec. 28, 2015. No Author, no date.*

* cited by examiner

*Primary Examiner* — Michael A Salvitti
(74) *Attorney, Agent, or Firm* — The Webb Law Firm

(57) ABSTRACT

A liquid coating composition is disclosed that is prepared from a reaction mixture comprising an amine component comprising (a) an amine component comprising a polyamine complexed with $CO_2$ and (b) a crosslinker, wherein the amine component is liquid at ambient conditions.

12 Claims, No Drawings

METHOD OF EXTENDING POT LIFE OF COATING COMPOSITIONS

FIELD OF THE INVENTION

The present invention relates to a carbon dioxide amine complex for use in a coating composition, more a particularly for use in a coating composition containing reactive amines.

BACKGROUND OF THE INVENTION

Crosslinked coating compositions that are based on an amine component typically are produced from two component systems that, when the two components are mixed together rapidly, cure at ambient conditions. The pot life of such coating compositions produced from amine functional components can be extended by converting the amine component to a related salt complex. For example, when carbon dioxide ($CO_2$) is reacted with amine, the amine forms a carbamate salt that is solid at room temperature. Upon heating, the $CO_2$ complexed with the carbamate salt is released and a liquid amine is then regenerated to function as a curing agent for the coating composition. Upon reaction of the amine with an isocyanate, polyurea may be formed. Other functional groups reactive with an amine may be included to produce other coating compositions.

In this process, an amine that is liquid at ambient conditions can be added to a solvent and gaseous $CO_2$ is bubbled through the solution in order to react the $CO_2$ with primary amines and/or secondary amines and form a carbamate salt. It is believed that the carbamate formulation occurs by forming a carbamic acid moiety in the presence of an amine (primary or secondary) whereby the carbamic acid protonates and forms a salt. Such salt complexes have been used to produce powder coating applications requiring an amine.

SUMMARY OF THE INVENTION

The present invention includes a liquid coating composition prepared from a reaction mixture comprising (a) an amine component comprising a polyamine complexed with $CO_2$ and (b) a crosslinker, wherein the amine component is liquid at ambient conditions. Also included in the present invention is a method of producing a coating composition comprising applying onto a substrate a liquid reaction mixture comprising (a) an amine component comprising a polyamine complexed with $CO_2$ and (b) a crosslinker, wherein the amine component is liquid at ambient conditions, whereby the polyamine disassociates from the $CO_2$ and reacts with the crosslinker.

DESCRIPTION OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "an" aromatic monoacid, "a" polyacid, "a" polyol, "an" aliphatic polyacid, and the like refers to one or more of any of these items.

As used herein, the transitional term "comprising" (and other comparable terms, e.g., "containing," and "including") is "open-ended" and is used in reference to compositions, methods, and respective component(s) thereof, that are essential to the invention, yet open to the inclusion of unspecified matter. The term "consisting essentially of" refers to those component(s) required for a given embodiment and permits the presence of component(s) that do not materially affect the properties or functional characteristic(s) of that embodiment. The term "consisting of" refers to compositions and methods that are exclusive of any other component not recited in that description of the embodiment.

The coating composition prepared from an amine component of the present invention includes an amine component that comprises a polyamine complexed with $CO_2$ that is liquid at ambient conditions. As used herein, "ambient conditions" refers to room temperature and humidity conditions or temperature and humidity conditions that are typically found in the area in which the coating composition is being applied to a substrate. When reacted with a crosslinker, a liquid coating composition is prepared from the reaction mixture such that the entire system remains liquid until curing. In one embodiment, the polyamine comprises a hindered polyamine which may be an aliphatic, cycloaliphatic, or aromatic polyamine. The amine component may include additional amines in addition to the hindered polyamine, the additional amine being an aliphatic, cycloaliphatic, and/or aromatic monoamine. To form a coating composition, the crosslinker includes at least two functional groups that are reactive with the amines. Suitable functional groups include isocyanate, oxirane, anhydride, aldehyde, ketone, beta-diketone, beta-ketoester, malonate, acrylate and/or fumarate components, and of which may be aliphatic, cycloaliphatic, and/or aromatic. For example, in order to produce polyurea, the crosslinker includes a multi-functional isocyanate and which may further include a mono-functional isocyanate, oxirane, anhydride, aldehyde, ketone, beta-diketone, beta-ketoester, malonate, acrylate, and/or fumarate. It should be appreciated that the present invention describes certain embodiments where the amines used to produce polyurea, however this is not mean to be limiting as the present invention may be used in other coating compositions that include reactive amines.

It is believed that the hindered amine is at least partially resistant to bonding with $CO_2$, so that the hindered amine complexed with $CO_2$ does not form a salt and remains liquid at ambient conditions, rendering the amine-$CO_2$ complex more readily handled than solid amine salt complex. The amine-$CO_2$ complex is liquid and stable at room temperature, so that the amine-$CO_2$ complex may be stored at ambient conditions for extended time periods. In addition, a reaction mixture including a crosslinker and the amine-$CO_2$ complex of the present invention exhibits a longer pot life compared to a reaction mixture containing the same crosslinker and the same amine that is not complexed with $CO_2$.

In use, the reaction mixture (polyamine complexed with $CO_2$ and a crosslinker) is handled so that the $CO_2$ dissociates from the polyamine at ambient conditions or elevated temperature such as up to 80° C. It is also possible to include a catalyst or accelerant such as a mineral acid in order to accelerate rate of dissociation of the $CO_2$ polyamine. For example, the $CO_2$ may dissociate from the polyamine upon spraying or atomization of the coating composition at ambient conditions. For example, when a liquid reaction mixture comprising an amine component comprising a liquid polyamine complexed with $CO_2$ and a crosslinker (where the crosslinker includes functional groups that are reactive with amines) is sprayed onto a substrate such as a metallic or nonmetallic substrate, the $CO_2$ dissociates from the polyamine such that the polyamine is reactive with the crosslinker and a coating composition forms on the substrate.

It has been found that the $CO_2$-amine complex remains liquid at ambient conditions and can increase the pot life of a reaction mixture as compared to a reaction mixture having the same amine that is not complexed with $CO_2$.

The following examples are presented to demonstrate the general principles of the invention. The invention should not be considered as limited to the specific examples presented. All parts and percentages in the examples are by weight unless otherwise indicated.

EXAMPLES

Example 1

Preparation of a $CO_2$-Amine Complex Resin

A $CO_2$-amine complex resin was prepared by adding 200.0 grams of DESMOPHEN® NH 1420 to a 250 mL glass Erlenmeyer flask equipped with a stirrer. $CO_2$ was then bubbled through the stirred amine resin at a rate of 1.0 standard cubic-foot per hour (SCFH) for five days at ambient conditions and under ambient atmosphere. The reaction mixture remained a clear and colorless liquid for the duration of the 5 day period, and there was no apparent change in viscosity compared to the DESMOPHEN® NH 1420 amine resin. The reaction mixture was then poured out into a glass jar and placed in an ambient temperature ultra-sonication bath for 30 minutes (Fisher Scientific FS30H) to remove any excess $CO_2$ gas dissolved in the reaction mixture.

Example 2

Coating Composition

A polyurea coating composition was prepared as follows using the components of Table 1.

TABLE 1

2K Polyurea Pigmented Topcoat Preparation

| Coating Components | | Weight |
|---|---|---|
| A (Comparative) | B | (grams) |
| DESMOPHEN® NH 1420[1] | $CO_2$-Amine Complex of Example 1 | 27.6 |
| Eastman MAK[2] | Eastman MAK | 18.4 |
| Acetone | Acetone | 11.6 |
| TINUVIN® 292[3] | TINUVIN® 292 | 1.1 |
| TINUVIN® 1130[4] | TINUVIN® 1130 | 1.1 |
| DISPERBYK® 2155[5] | DISPERBYK® 2155 | 0.7 |
| AEROSIL® 200[6] | AEROSIL® 200 | 0.2 |
| BYK-333[7] | BYK-333 | 0.2 |
| MAPICO® 1050A[8] | MAPICO® 1050A | 12.7 |
| TIONA® 595[9] | TIONA® 595 | 3.0 |
| KROMA RED® RO3097[10] | KROMA RED® RO3097 | 0.1 |
| MONARCH® 1300[11] | MONARCH® 1300 | 0.1 |
| CAT 143[12] | CAT 143 | 23.2 |

[1]Amine-funcitonal resin, commercially available from Bayer Material Science.
[2]Methyl n-amyl ketone, commercially available from Eastman Chemical Co.
[3]Light stabilizer, commercially available from Ciba Specialty Chemicals.
[4]Light stabilizer, commercially available from Ciba Specialty Chemicals.
[5]Wetting and dispersing additive, commercially available from BYK
[6]Hydrophobic fumed silica, commercially available from Evonik Industries.
[7]Flow and leveling additive, commercially available from BYK
[8]Ferric oxide hydrate (pigment), commercially available from Rockwood.
[9]Titanium dioxide (pigment), commercially available from Crystal Global.
[10]Ferric oxide (pigment), commercially available from Rockwood.
[11]Black pigment, commercially available from Cabot Corporation.
[12]PPG produced polyisocyanate cross-linker 9.8 Grams of Eastman MAK, and all of the TINUVIN® 292, TINUVIN® 1130, DISPERBYK® 2155, MAPICO® 1050A, TIONA® 595, KROMA RED® RO3097, and MONARCH® 1300 were added together in an appropriate sized container and dispersed under high shear force until a particle size of less than 10 μm was obtained, determined by a Hegman "Fineness of Grind Gauge" in accordance with ASTM D1210. For composition A, DESMOPHEN® NH 1420, the remaining solvents (8.6 g MAK and acetone), BYK-333, and AEROSIL® R-812 were added and stirred under moderate to low shear conditions until the ingredients were well incorporated and a homogeneous mixture was observed. For composition B, the $CO_2$-amine complex of Example 1 was added, the remaining solvents (8.6 g MAK and acetone), BYK-333, and AEROSIL® R-812 were added and stirred under moderate to low shear conditions until the ingredients were well incorporated and a homogeneous mixture was observed. Composition B was then placed in an ambient temperature ultra-sonication bath for 10 minutes to eliminate any remaining $CO_2$ gas from the liquid coating. A polyisocyanate cross-linker (HR-86-9357) was then added to both compositions A and B. The viscosity of both compositions A and B were measured just after mixing with the cross-linker and periodically at 15 minute intervals over the course of one hour using a Brookfield CAP 2000 high shear viscometer (#1 spindle, 75 RPM), as reported in Table 2. Examples of non-reactive additives that can be included in the coating composition are light stabilizers, wetting and dispersing additives, hydrophobic fumed silicas, flow and leveling additives, pigments, and catalysts.

TABLE 2

Viscosity Change of the Mixed Coatings Over One Hour

| Time (min) | Coating A (Comparative) Visc (cP) | Coating B Visc (cP) |
|---|---|---|
| 0 | 20 | 25 |
| 15 | 60 | 45 |
| 30 | 140 | 90 |
| 45 | 230 | 160 |
| 60 | 340 | 260 |

As can be seen in Table 2, the coating utilizing the $CO_2$-amine complex resin of Example 1 (Coating B) showed a lower viscosity at each 15 minute interval compared to the Comparative Coating A utilizing DESMOPHEN® NH 1420 amine resin. Coating B exhibited a 23.5% lower viscosity than Coating A after 60 minutes.

Immediately after mixing with the isocyanate crosslinker, Coatings A and B were spray applied at ambient temperature and humidity conditions using a Graco AirPro compliant spray gun over an uncured solvent borne 2K polyurethane primer on a Bondrite B-1000 iron-phosphate (with deionized water rinse) treated cold-rolled steel substrate. The dry time of the coatings at ambient temperature and humidity were measured by pressing on the coatings with a gloved finger (light applied force in 5 minute intervals) until an indentation was no longer transferrable to the coatings, at which point the coatings were deemed dry. After curing for an additional 24 hours at ambient temperature and ambient humidity, both coatings were subjected to an MEK double rub test, in accordance with ASTM D 5402, to determine the extent of curing. As reported in Table 3, the coatings showed equal dry times and similar cure responses after 24 hours.

TABLE 3

Comparison of Dry Times and Solvent Resistances of Cured Films

| Coating | Dry Time | MEK Double Rub Test |
|---|---|---|
| A (Comparative) | 40 min | >100 double rubs |
| B | 40 min | >100 double rubs |

Although the present invention has been described with reference to specific details of certain embodiments thereof, it is not intended that such details should be regarded as limitations upon the scope of the invention except insofar as they are included in the accompanying claims.

The invention claimed is:

1. A method of producing a coated substrate, comprising: spraying onto a substrate a liquid reaction mixture comprising:
   (a) an amine component liquid at ambient conditions comprising a polyamine complexed with $CO_2$, and
   (b) a crosslinker,
   whereby the polyamine disassociates from the $CO_2$ upon spraying and is reactive with the crosslinker.

2. The method of claim 1, wherein said polyamine comprises a hindered polyamine.

3. The method of claim 2, wherein said hindered polyamine comprises an aliphatic, cycloaliphatic, or aromatic polyamine.

4. The method of claim 1, wherein said crosslinker comprises at least two functional groups reactive with amines.

5. The method of claim 4, wherein said functional groups comprise an isocyanate, oxirane, anhydride, aldehyde, ketone, beta-diketone, beta-ketoester, malonate, acrylate, and/or fumarate.

6. The method of claim 4, wherein said functional groups comprise an isocyanate.

7. The method of claim 5, wherein the crosslinker comprises a monofunctional isocyanate, oxirane, anhydride, aldehyde, ketone, beta-diketone, beta-ketoester, malonate, acrylate, and/or fumarate.

8. The method of claim 5, wherein said crosslinker comprises an aliphatic, cycloaliphatic, and/or aromatic crosslinker.

9. The method of claim 1, wherein said $CO_2$ dissociates from said polyamine upon spraying at ambient conditions.

10. The method of claim 1, wherein said $CO_2$ dissociates from said polyamine upon spraying at an elevated temperature.

11. The method of claim 1, wherein the liquid reaction mixture further comprises a catalyst or an accelerant.

12. The method of claim 1, wherein the substrate comprises a metallic or non-metallic substrate.

* * * * *